United States Patent [19]

Runkel et al.

[11] 4,122,759
[45] Oct. 31, 1978

[54] JAM-PROOF ACTUATOR STRUCTURE

[75] Inventors: Manfred A. Runkel, Valencia; Joseph Licha, Chatsworth, both of Calif.

[73] Assignee: Textron Inc., Providence, R.I.

[21] Appl. No.: 750,110

[22] Filed: Dec. 13, 1976

[51] Int. Cl.² ........................ F16J 9/06; F16J 15/18; F15B 11/16
[52] U.S. Cl. ...................................... 92/168; 92/146; 92/193; 92/253; 91/508
[58] Field of Search ................. 92/193, 248, 249, 250, 92/251, 252, 253, 254, 168

[56] References Cited

U.S. PATENT DOCUMENTS

| 2,487,390 | 11/1949 | Smith | 92/250 |
|---|---|---|---|
| 2,615,769 | 10/1952 | Barnes et al. | 92/252 |
| 3,155,015 | 11/1964 | Genz | 92/249 |
| 3,884,127 | 5/1975 | Simmons | 92/193 |

FOREIGN PATENT DOCUMENTS 2,315,016  10/1974  Fed. Rep. of Germany ............ 92/193

*Primary Examiner*—Paul E. Maslousky
*Attorney, Agent, or Firm*—Nilsson, Robbins, Dalgarn, Berliner, Carson & Wurst

[57] ABSTRACT

An actuator, and a system employing the same, which will continue to operate after deformation of a portion thereof which deformation would normally restrict movement between the piston and cylinder of the actuator. The piston or gland of the actuator is constructed so as to include segmented flanges which will fracture responsive to forces applied to them upon engagement of the deformation. Slots defining the segments are filled with a rubber-like material which is bonded to the piston or gland thus providing a solid structure to enable appropriate sealing while not interfering with the fracturability of the segments.

9 Claims, 5 Drawing Figures

JAM-PROOF ACTUATOR STRUCTURE

BACKGROUND OF THE INVENTION

To overcome difficulties encountered as a result of deformation of portions of actuators it has been suggested that pistons or glands of the actuator be constructed to provide frangible portions which upon striking the deformation will fracture thereby allowing the actuator to continue to operate. Such frangibility is provided through utilization of a plurality of frangible segments formed by a plurality of radially extending slots in opposed flanges along with a score line at the base of the slots. Such structure is disclosed in U.S. Pat. No. 3,884,127.

Although such structure operates satisfactorily in most instances, it has been discovered that in those applications where a relatively small clearance exists between the internal cylinder wall and the piston rod outer diameter previously unforeseen difficulties are encountered.

One such difficulty is the fact that the segments are relatively short thereby providing a small moment arm and thus a larger amount of force is required to cause a fracture of the segment. Under some circumstances, the amount of force required is so great that the actuator including any additional stages in a redundant system is incapable of generating sufficient force to effectuate a fracture of the segment.

An additional difficulty which has been encountered in the small clearance actuators is that the typical deformation of a cylinder wall, as by a projectile penetrating the same, causes the deformed portion of the wall to be immediately adjacent the external surface of the piston rod of the actuator. When utilizing the prior art structures, assuming the segments have, in fact, fractured and broken off, there is typically a small rim or protrusion extending upwardly from the surface of the piston rod at the point of the fracture. This protrusion contacts the deformed portion of the cylinder wall and prevents further movement of the piston relative to the cylinder.

A further problem which has been encountered with the prior art structures in small clearance devices is that the segments when they fracture and break off often wedge between the piston rod and the internal wall of the cylinder. This wedging phenomina is caused to occur because a rim at the periphery of the segments is provided which causes the widest portion of the segments to be at the outer periphery thereof. When a force causes the segments to fracture they are then caused to rotate inwardly (toward the seal groove) and the distance between the outer corner of the segment and the inner corner at the point of fracture is much greater than the clearance in existance between the cylinder wall and the piston rod thereby causing the fractured segment to wedge in place thus affecting deleteriously the operation of the apparatus.

SUMMARY OF THE INVENTION

An actuator having a jam-proof structure including a cylinder-piston combination including respectively a metallic gland and a metallic piston. Either the gland or piston or both defines a groove which receives a seal and thus forms a pair of opposed flanges which define slots to thus provide a plurality of radially disposed segments. The slots and the bottom the the groove are filled with a rubber-like material which is bonded to the flanges to thus provide solid flanges having segments of alternate metal and rubber-like material.

Through utilization of this structure, the slots provided in the flanges may be made substantially longer thus creating a longer segment and a longer moment arm thereby allowing the segments to be broken off with lesser force. With the rubber-like material sealing the slots the pressure differential necessary on opposite faces of the piston or across the gland, for proper operation may be maintained even though the slots extend below the inner surface of the seals normally required in such structures.

In addition to the foregoing structure, the flanges formed by the groove are tapered to provide a smaller width at the outer edge of the seal groove thereby providing a shorter distance between the outer edge of the segment and its point of rotation at its base, thereby substantially reducing, and for the most part eliminating the wedging of the segments when it fractures and breaks off.

DETAILED DESCRIPTION OF THE PREFERRED EMBODIMENT

Figure 1:
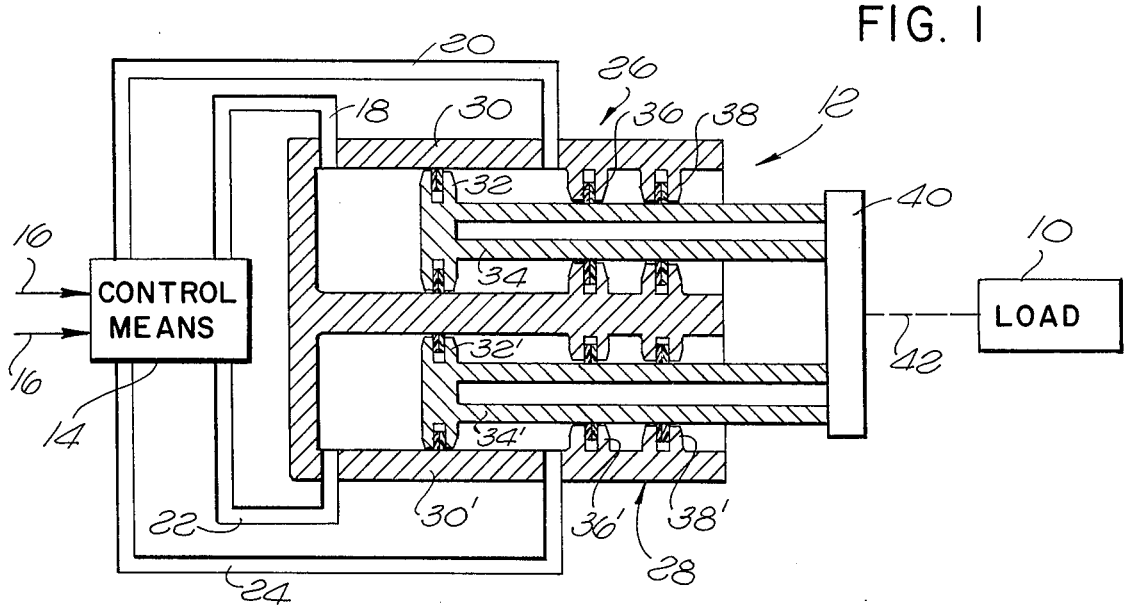
FIG. 1 is a schematic diagram of an actuator system employing a jam-proof actuator constructed in accordance with the present invention.

Referring now to the drawings and particularly to FIG. 1 there is shown in schematic form a system which includes a jam-proof hydraulic actuator constructed in accordance with the principles of the present invention. As is therein shown a load 10 is moved by a pair of actuators 12 coupled together in a redundant fashion and positioned in accordance with signals applied to a control means 14. In the event a cylinder wall of one of the actuators 12 is deformed, or alternatively the piston rod, such would operate as an abutment or deformation which, with standard actuators, would cause the entire system to become inoperable. Such would occur simply because insufficient force would be generated to drive the piston beyond the obstruction thus created. In accordance with the teachings of U.S. Pat. No. 3,884,127, the frangible structure above referred to is employed to permit continued operation of the actuators 12 even in the event of such a deformation. This invention is an improvement over that disclosed in U.S. Pat. No. 3,884,127 and permits operation of a system such as that shown in FIG. 1 even when very close and small internal clearances in the actuator are included.

Thus in accordance with the present invention the system employing the jam-proof structure would be operated by signals applied to the input leads 16 of the control means 14 and which signals would emanate from the pilot, the stability augmentation system, or other control apparatus typically employed on aircraft. As the control means 14 responds to the input signals applied to the leads 16, hydraulic fluid is caused to flow through the conduits 18, 20, 22 and 24 to and from the actuators 26 and 28. The actuator 26 includes a cylinder 30 having a piston 32 slidably positioned therein. A piston rod 34 is connected to the piston 32 and extends through the glands 36 and 38. The actuator 28 is identical to actuator 26 and such is indicated by using the same reference numerals primed with respect to the various portions thereof. The piston rods 34 and 34' are interconnected by the yoke 40 which in turn is connected to the load 10 as is indicated by the dashed line 42. Thus as hydraulic fluid flows through the conduits 18 through 24 the piston 32-32' are caused to reciprocate within their respective cylinders 30-30' and the load 10 is positioned accordingly. In the event one of the cylinders such as 30' is deformed by a projectile hitting and/or penetrating the same, the segmented flanges on the piston 32' would fracture, due to the forces exerted by piston 32, thereby allowing the piston 32' to pass the deformation and the piston 32 would thereafter provide sufficient force to continue to position the load 10 even though the actuator 28 was no longer functioning.

Figure 2:
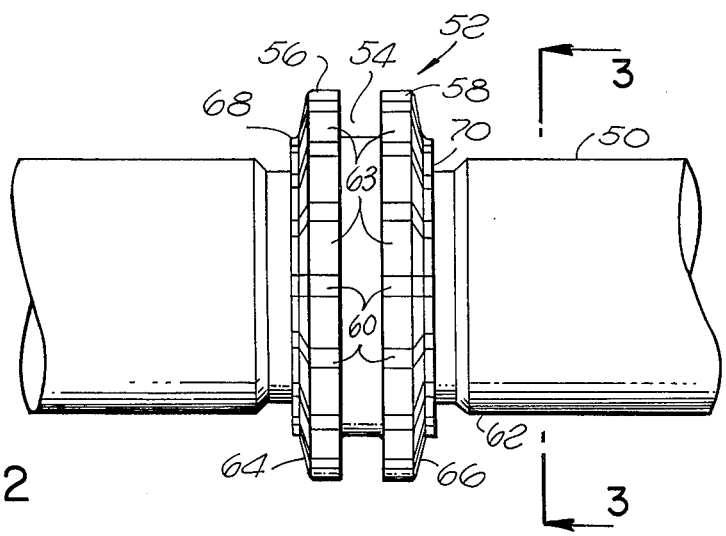
FIG. 2 is an elevational view of a piston constructed in accordance with the present invention.

Turning now to FIG. 2, there is illustrated a piston constructed in accordance with the principles of the present invention. As will be appreciated the piston rod 50 extends from both sides of the piston and thus represents a piston embodiment which may be used in a tendem actuator. As is therein shown the piston rod 50 has the piston head 52 formed thereon. The piston head defines a peripheral groove 54 which extends radially inwardly toward the piston rod 50. The formation of the groove 54 thus provides a pair of opposed flanges 56 and 58. Each of the flanges 56 and 58 are segmented, for example, by providing slots such as shown at 60. It should be noted that in accordance with one of the features of the present invention, the slots 60 terminate at the outer edge 62 of the rod 50. Thus the piston head flanges 56 and 58 are segmented by forming the radial slots 60 so that they extend radially inwardly from the outer edge of the flanges 56 and 58 to the outer surface 62 of the piston rod 50.

It should also be noted that the outer walls 64 and 66 of the flanges 56 and 58, respectively, are tapered inwardly toward the groove 54 to thus cause the outer surface of the flanges to be smaller in width than the base thereof. In addition, the base of the flanges 56 and 58 are thickened by providing the stop member 68 and 70 on the flanges 56 and 58, respectively. The stop members 68 and 70 engage stops provided internally of the actuators 26 and 28 thereby limiting the movement of the pistons within the cylinder as is well known in the art.

Figure 3:
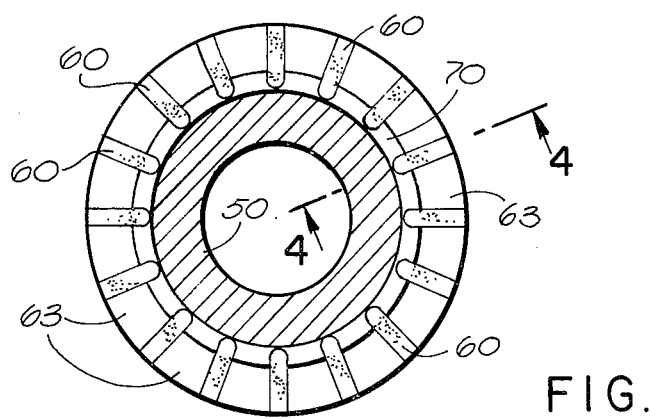
FIG. 3 is a plan view partly in cross section taken about the lines 3—3 of FIG. 2.

With nothing more, the structure as illustrated in FIGS. 2 and 3 and thus far described will not operate properly as will be recognized by those skilled in the art. With the slots 60 being formed completely through the flanges 56 and 58 and extending to the rod surface 62, a situation is created such that when differential pressure is applied across the piston head 52 leakage would occur through the slots 60 from one side thereof to the other even though a seal is placed within the groove 54. In prior art structures such as shown in U.S. Pat. No. 3,884,127 the slots stop well short of the rod outer surface thus providing a substantial portion of the solid flanges extending above the bottom of the seal groove. Thus to permit the formation of the slots to the depth described in conjunction with FIGS. 2 and 3 and at the same time to enable proper operation of the structure and in accordance with the principles of the present invention the slots 60 and a portion of the groove 54 are filled with a rubber-like substance. Such will be more fully understood by reference to FIG. 4 which is a fragmentary view in cross section taken about the lines 4-4 of FIG. 3, which lines extend through the rubber-like substance disposed within one of the grooves 60.

Figure 4:
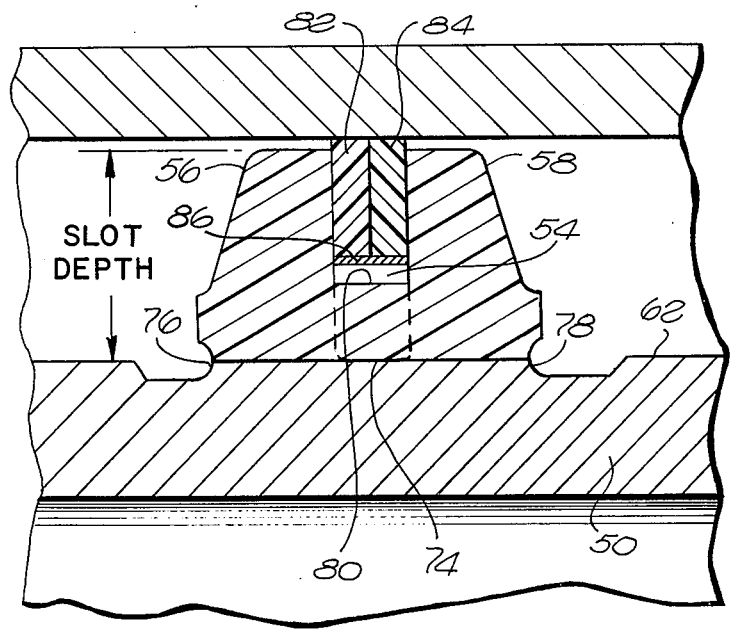
FIG. 4 is a fragmentary cross sectional view taken about the lines 4—4 of FIG. 3.

As is shown in FIG. 4, the groove 54 is formed so that the bottom or base thereof is at the same level as the outer surface 62 of the rod 50 and such is shown at 74. As was referred to above, the depth of the slots also extend to the same level. To appropriately weaken the segments of the flanges 56 and 58 the piston rod 50 is undercut as by a recess in the outer surface 62 thereof beneath each of the flanges 56 and 58 as is shown at 76 and 78, respectively.

The slots 60 as well as a portion of the groove 54 from the bottom 74 thereof to a level as shown at 80 is filled with a rubber-like substance. The rubber-like substance may be any known to the art which will withstand the pressures across the piston head, will bond to the metal from which the piston head and the piston rod is formed and which will shear off when the segments 63 of the flanges meet a deformation and shear off. As some examples of such rubber-like substances presently known are butadien, room-temperature vulcanized silicone rubber and well known nitrile compounds.

A seal in the form of a pair of nylon piston rings 82 and 84 are inserted within the groove 54 along with a wave washer 86 which applies force outwardly against the piston ring to cause it to engage the inner wall of the cylinder and effect a seal therewith as is well known in the art. By building up the groove 54 between its lower portion 74 and the upper surface 80 with the rubber-like material enables utilization of standard piston rings and wave washers currently used in the art.

The slots 60 and the lower portion of the groove 54 may be filled with the rubber-like substance in various ways known to those skilled in the art. For example, the piston head may be inserted into a mold having the desired shape and the rubber-like substance may be injected under pressure to fill the slots and the grooves. The material may then be cured in accordance with well known processes and trimmed to conform to the required dimensions of the flanges 56 and 58.

Figure 5:
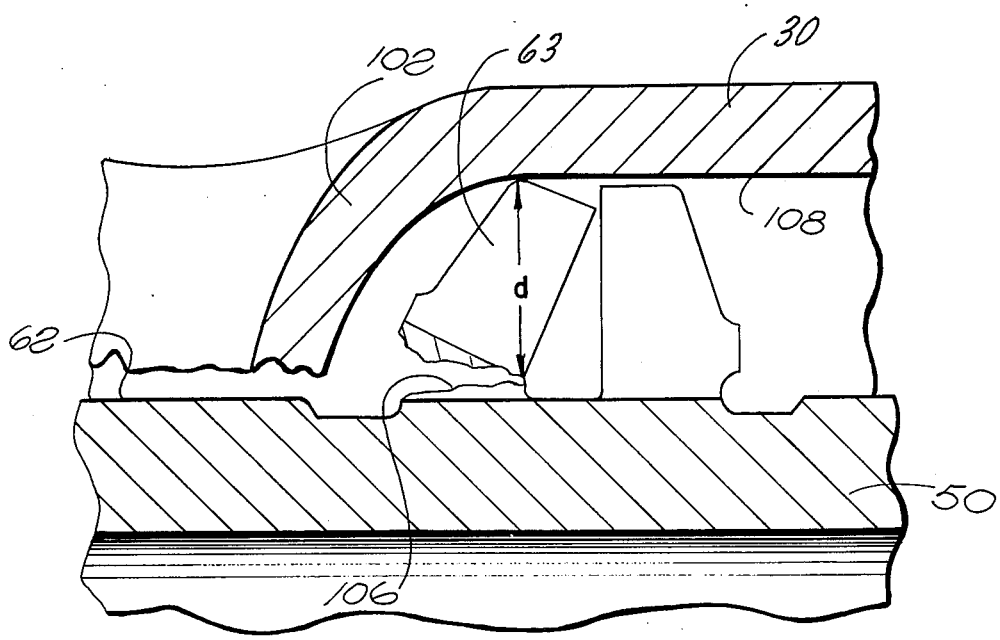
FIG. 5 is a view similar to FIG. 3 but illustrating the functioning of the piston in response to a deformation of the cylinder wall of the actuator.

With the structure as hereinabove described, it will now be recognized that when the segments 63 formed in the flanges 56 and 58 contact a deformation such as shown at 102 in FIG. 5, the segment 63 will be broken along a surface 106 conforming substantially to the same height as the outer surface 62 of the rod 50. The rubber-like material within the slots 60 will shear off permitting the segment to fracture and be removed as an impediment to the passage of the deformation 102. As will be noted, the distance $d$ between the corners of the segment 63 is only very slightly larger than the distance along the inner wall of the flange and the outer edge is slightly rounded thereby substantially reducing, if not eliminating, any tendency for the segment 63 to wedge between the rod 50 and the inner surface 108 of the cylinder 30. It will be understood by those skilled in the art that the rubber-like material and the piston ring have been eliminated from FIG. 5 for purposes of clarity of illustration and ease of understanding only. The rubber-like substance within the groove 54 as more clearly illustrated in FIG. 4 would compress upon the application of the segment 63 thereagainst.

For purposes of the specification and claims contained herein, the term "rubber-like substance" means any pliable material which bonds to the piston head and piston rod.

What is claimed is:

1. An actuator having a jam-proof structure for allowing said actuator to continue movement subsequent to deformation of a portion thereof, said actuator comprising:
   a cylinder including a metallic gland member defining an opening therethrough;
   a metallic piston member slidably disposed within said cylinder and having a rod defining an outer periphery connected thereto and extending through said opening in said gland member;
   said piston member including a pair of spaced apart radially extending opposed flanges;
   said opposed flanges defining a plurality of radially extending slots therethrough thereby providing a plurality of radially disposed segments in said flanges, said slots extending to a depth such that the bottom of each slot is at substantially the outer periphery of said rod; and
   a rubber-like material filling each of said slots and bonded to said flanges to provide solid flanges of alternate metal and rubber-like material.

2. An actuator as defined in claim 1 wherein the thickness of said flanges radially decreases.

3. An actuator as defined in claim 2 wherein the outer wall on each flange tapers inwardly from the base to the periphery of said flange.

4. An actuator as defined in claim 3 wherein the space between said flanges defines a groove which includes a base portion, said groove being partially filled from said base portion toward the periphery of said flanges with said rubber-like material.

5. An actuator as defined in claim 4 wherein said rubber-like material in said slots and in said groove is bonded together.

6. An actuator as defined in claim 5 wherein said piston and said rod are formed as an integral unitary member.

7. An actuator as defined in claim 6 wherein said rod defines a continuous groove at the base of each flange thereby to weaken said flanges for causing segments thereof to fracture along a surface substantially aligned with the outer diameter of said rod.

8. An actuator as defined in claim 7 wherein the peripheral edge of each flange at the outer wall thereof is rounded.

9. An actuator as defined in claim 8 wherein said weakening continuous groove is disposed at the base of the outer wall of each of said flanges.

* * * * *